(12) United States Patent
Hwang

(10) Patent No.: US 6,556,446 B1
(45) Date of Patent: Apr. 29, 2003

(54) OPTOELECTRONIC TRANSCEIVER MODULE ASSEMBLY

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/020,555

(22) Filed: Dec. 13, 2001

(51) Int. Cl.[7] .............................. H05K 7/00; H05K 7/14
(52) U.S. Cl. ........................ 361/728; 361/736; 361/740; 361/801; 439/377; 385/92
(58) Field of Search .................................. 361/728, 729, 361/730, 736, 737, 752, 759, 801, 807, 740; 439/377, 59; 385/88, 92

(56) References Cited

U.S. PATENT DOCUMENTS 5,767,999 A * 6/1998 Kayner ...................... 359/163
6,304,436 B1 * 10/2001 Branch et al. .............. 361/683
6,483,711 B1 * 11/2002 Huang ........................ 361/736

* cited by examiner

Primary Examiner—Jayprakash N. Gandhi
(74) Attorney, Agent, or Firm—Wei Te Chung

(57) ABSTRACT

An optoelectronic transceiver module assembly includes an optoelectronic transceiver module, and a metal cage encasing the optoelectronic transceiver module therein. The transceiver module includes a connector housing (1), a PCB (2) and a support base (3). The connector housing is adapted for engaging a complementary electrical or optical connector. The PCB is engaged in guide grooves (151) of the connector housing. Block tags (153) formed in the guide grooves firmly retain the PCB. The support base is attached to the PCB with screws, and accommodates and supports the PCB. The cage comprises a top frame (4) and a bottom plate (5). The bottom plate is fittingly attached to the connector housing and to the support base. Locking tabs (419, 421, 423) of the top frame engagingly retain the connector housing. Engaging tabs (523) of the bottom plate are engaged in sockets (413) of the top frame.

15 Claims, 4 Drawing Sheets

OPTOELECTRONIC TRANSCEIVER MODULE ASSEMBLY

BACKGROUND OF THE INVENTION

1. Field of the Invention

The present invention relates to an optoelectronic transceiver module assembly for fiber-optic communications, and in particular to an optoelectronic transceiver module assembly which is conveniently assembled and which is reliable.

2. Description of the Related Art

Optoelectronic transceiver modules provide bi-directional transmission of data between an electrical interface and an optical data link. The module receives electrically encoded data signals, which are converted into optical signals and transmitted over the optical data link. The module also receives optically encoded data signals, which are converted into electrical signals and transmitted onto the electrical interface.

U.S. Pat. No. 6,178,096 B1 discloses a conventional optoelectronic transceiver module. The module comprises a top cover and a bottom cover. The top and bottom covers are fixed together by mating a positioning post of the top cover in a hole of the bottom cover. The top and bottom covers thereby enclose a printed circuit board (PCB) and optoelectronic components. However, when the module is subjected to vibration during normal use, the top and bottom covers are easily displaced from the module. This can adversely affect the operation of the module.

U.S. Pat. No. Re. 36,820 discloses another conventional optoelectronic transceiver module. A PCB and other optoelectronic components are placed in a rectangular box. Potting material is injected into the box, to enclose the PCB and the optoelectronic components. An enclosure of the transceiver module fixes and protects the PCB. However, the potting material is expensive and unduly troublesome to use.

In view of the above, there is a need for a reliable, durable and inexpensive optoelectronic transceiver module assembly, all parts of which can be fixed together quickly, easily and securely.

SUMMARY OF THE INVENTION

Therefore, an object of the present invention is to provide an optoelectronic transceiver module assembly, all parts of which are fixed together securely and reliably.

Another object of the present invention is to provide an optoelectronic transceiver module assembly which can be easily and quickly assembled.

A further object of the present invention is to provide an optoelectronic transceiver module assembly which is inexpensive.

To achieve the above objects, an optoelectronic transceiver module assembly of the present invention includes an optoelectronic transceiver module, and a metal cage receiving the optoelectronic transceiver module therein. The transceiver module includes a connector housing, a PCB, and a support base. The connector housing is adapted for engaging with a complementary electrical or optical connector. The PCB is engaged in guide grooves of the connector housing. Block tags formed in the guide grooves firmly retain the PCB. The support base is attached to the PCB with screws, and accommodates and supports the PCB. The cage comprises a top frame and a bottom plate. The bottom plate is fittingly attached to the connector housing and to the support base. Locking tabs of the top frame engagingly retain the connector housing. Engaging tabs of the bottom plate are engaged in sockets of the top frame. Thus the optoelectronic transceiver module assembly is easily and securely assembled. The top frame and bottom plate form a complete metal shell encasing the optoelectronic transceiver module therein.

Other objects, advantages and novel features of the present invention will be drawn from the following detailed description of a preferred embodiment of the present invention with attached drawings, in which:

DETAILED DESCRIPTION OF THE INVENTION

Figure 1:
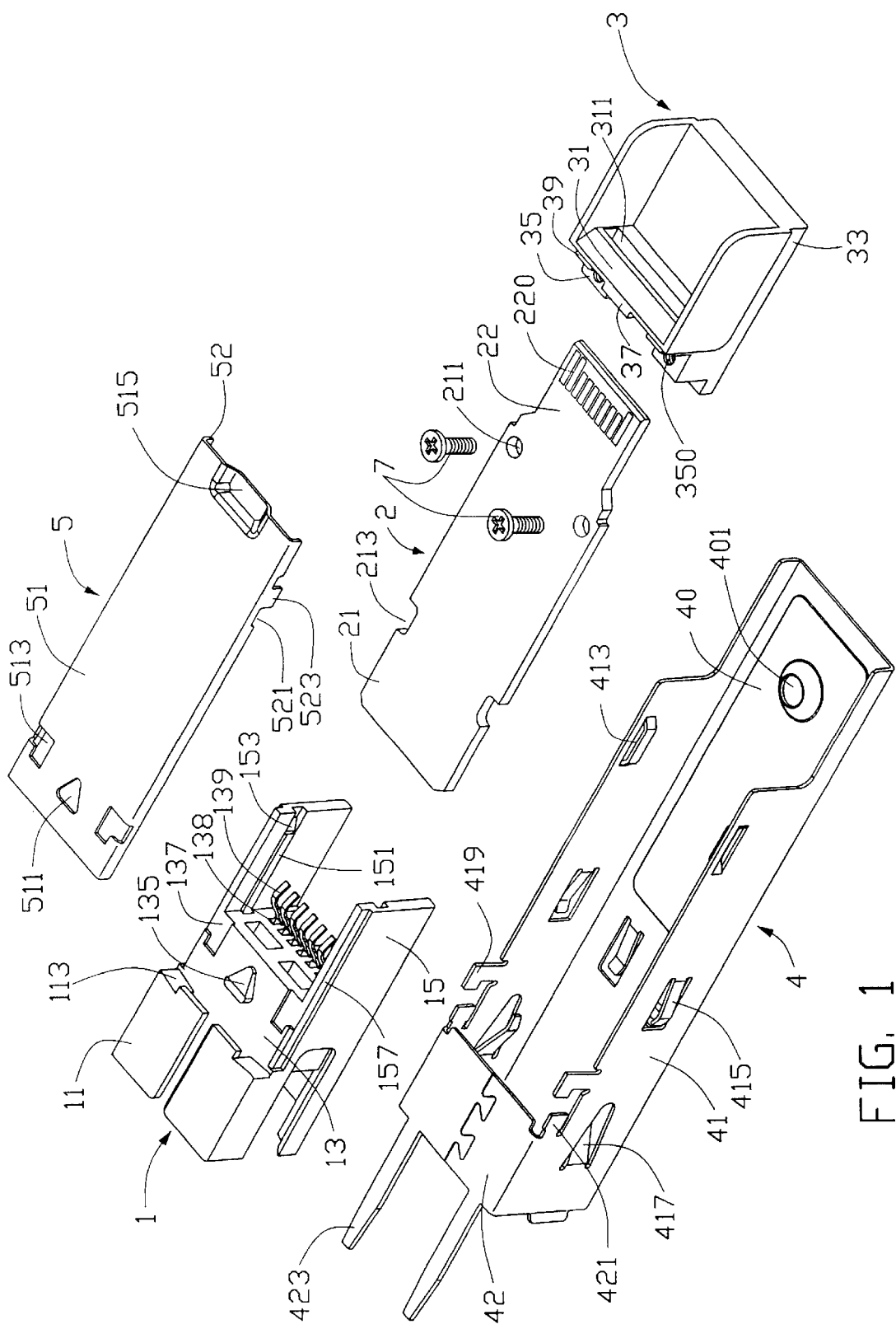
FIG. 1 is an exploded view of an optoelectronic transceiver module assembly in accordance with the present invention, viewed from a bottom aspect.

Referring to FIG. 1, an optoelectronic transceiver module in accordance with the present invention has an insulative connector housing 1, a printed circuit board (PCB) 2 and an insulative support base 3. An optoelectronic transceiver module assembly in accordance with the present invention comprises a cage receiving the optoelectronic transceiver module therein. The cage comprises a top frame 4 and a bottom plate 5.

The connector housing 1 comprises a front portion 11, a rear portion 13, and a pair of side walls 15 extending from opposite sides of the rear portion 13 respectively. The front portion 11 is disposed lower than the rear portion 13. A pair of steps 113 is thereby formed in the front portion 11 where it adjoins the rear portion 13. The front portion 11 has an opening (not labeled) defined therein, for receiving a complementary electrical connector (not shown) or a complementary optical connector (not shown). A triangular latch 135 is formed on a bottom surface of the rear portion 13. A pair of cutouts 137 is respectively defined in opposite sides of the bottom surface of the rear portion 13. The cutouts 137 are located generally at respective opposite sides of the latch 135. A longitudinal positioning groove 157 is defined in a junction of each side wall 15 and the bottom surface of the rear portion 13. Each positioning groove 157 is in communication with its proximate cutout 137. A longitudinal guide groove 151 is defined in an inner surface of each side wall 15. A block tag 153 is formed on the inner surface of each side wall 15 in the corresponding guide groove 151. The block tags 153 are located near rear ends of the respective side walls 15. A plurality of terminal-receiving passages 138 is defined in the rear portion 13, and a plurality of conductive terminals 139 is retained in the passages 138. Contact portions of the terminals 139 engage with corresponding contacts on the PCB 2.

Figure 2:
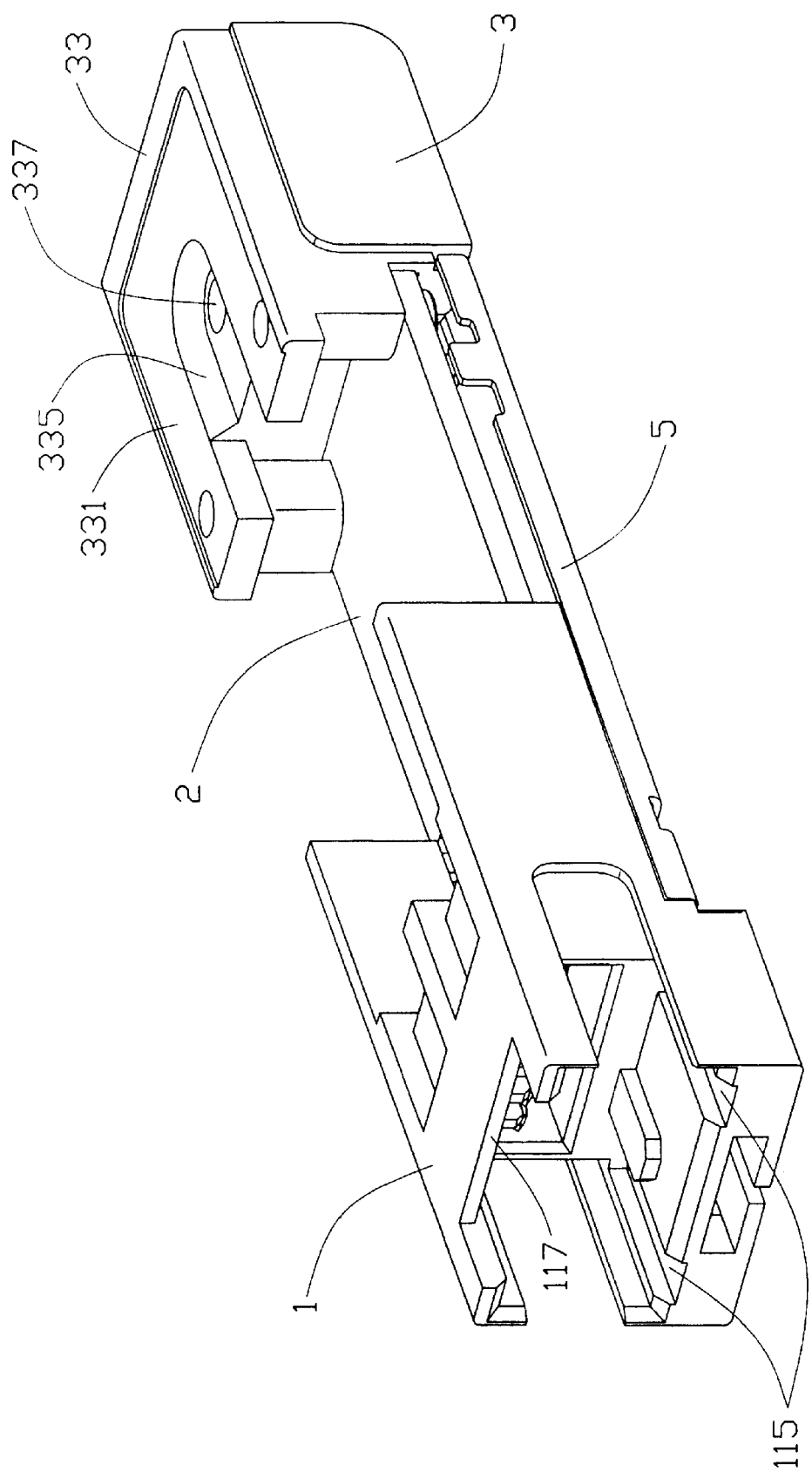
FIG. 2 is an assembled view of an optoelectronic transceiver module and a top cage, both of the optoelectronic transceiver module assembly of FIG. 1, viewed from a top aspect.

Referring particularly to FIG. 2, the connector housing 1 also comprises a top wall 117. A pair of spaced and parallel longitudinal locking grooves 115 is defined in an inside face of the front portion 11 of the connector housing 1.

The PCB 2 has a wide front section 21, and a narrow rear section 22. Two positioning holes 211 are defined in the front section 21, at opposite sides respectively of the front section 21 near the rear section 22. Walls of the PCB 2 that surround the positioning holes 211 are coated with conductive material, and the conductive material is connected with a grounding circuit (not labeled) of the PCB 2. The rear section 22 has a row of electrical contacts 220 at a rear end thereof, for electrical connection of the PCB 2 with a complementary electrical connector (not shown). A pair of recesses 213 is respectively defined in opposite side edges of the front portion 21, for engagingly receiving the block tags 153 of the connector housing 1. A pair of screws 7 corresponds to the positioning holes 211.

The support base 3 is made of plastic or other suitable material, and is generally box-shaped. The support base 3 comprises a chassis 33, and an inner end wall 31 depending from near an inner end of the chassis 33. Two support protrusions 35 are respectively formed on opposite sides of the chassis 33, and integrally adjoin a face of the end wall 31. Two screw holes 350 are respectively defined in the support protrusions 35, corresponding to the positioning holes 211 of the PCB 2. Two upper blocks 39 are respectively formed at opposite sides of the face of the end wall 31, and integrally adjoin the proximate support protrusions 35 respectively. A lower block 37 is formed on a bottom central portion of the face of the end wall 31. The lower block 37 is disposed lower than the upper blocks 39, and generally between the upper blocks 39. The lower block 37 and upper blocks 39 cooperatively define a gap (not labeled) therebetween, for holding an end of the bottom plate 5 (see FIG. 3). A slot 311 is through in the end wall 31, for receiving the rear section 22 of the PCB 2.

Referring particularly to FIG. 2, the chassis 33 of the support base 3 has a shallow trough 331 defined in a top surface thereof. An arch-shaped groove 335 is defined in the top surface of the chassis 33, below and in communication with the shallow trough 331. A screw hole 337 is defined in the top surface of the chassis 33, below and in communication with the arch-shaped groove 335.

Referring back to FIG. 1, the top frame 4 is made of metal, and has a generally U-shaped profile. The top frame 4 has a rectangular top plate 40, two side walls 41 depending from the top plate 40, and a bottom cover 42 disposed at a front end of the top frame 4. An opening (not labeled) is defined at the front end of the top frame 4, corresponding to the opening (not labeled) of the connector housing 1. A pair of rectangular locking tabs 421 respectively extends rearwardly from front portions of the side walls 41 at a rear end of the bottom cover 42, for engaging with the connector housing 1. A pair of L-shaped locking tabs 419 respectively depends from the side walls 41 rearwardly of the rectangular locking tabs 421, for engaging with the connector housing 1. A pair of spaced elongate locking tabs 423 extends from a front end of the bottom cover 42, for engaging with the connector housing 1. A pair of sockets 413 is inwardly formed by stamping bottom portions of the side walls 41 respectively. A pair of spring fingers 415 extends outwardly from the side walls 41 respectively. Another pair of spaced spring fingers 415 extends outwardly from the top plate 40. The spring fingers 415 electrically connect with an external device (not shown) to provide protection against electrostatic discharge (ESD). A pair of grounding fingers 417 extends inwardly from the front portions of the side walls 41 respectively, for engaging with the complementary electrical connector (not shown) or the complementary optical connector (not shown) and establishing grounding connections with the external device (not shown). A through hole 401 is inwardly stamped through a rear portion of the top plate 40, corresponding to the screw hole 337 of the support base 3. A labeling tape 551 is attached to a top face of the top plate 40 (see FIG. 4).

The bottom plate 5 is made of metal, and has a main panel 51. A pair of flanges 52 extends from opposite longitudinal sides of the main panel 51 respectively. A triangular opening 511 is defined in a middle of a front portion of the main panel 51, for receiving the latch 135 of the connector housing 1. A pair of cutouts 513 is respectively defined in opposite sides of the front portion of the main panel 51. The cutouts 513 are located generally at respective opposite sides of the opening 511, and correspond to the cutouts 137 of the connector housing 1. A trough portion 515 is inwardly stamped at a rear end of the main panel 51, corresponding to the gap between the lower and upper blocks 37, 39 of the support base 3. A pair of engaging tabs 523 extends from rear portions of the flanges 52 respectively, for engaging in the sockets 413 of the top frame 4. A pair of narrow cavities 521 is defined in the flanges 52 respectively, in front of and adjoining the engaging tabs 523.

Figure 3:
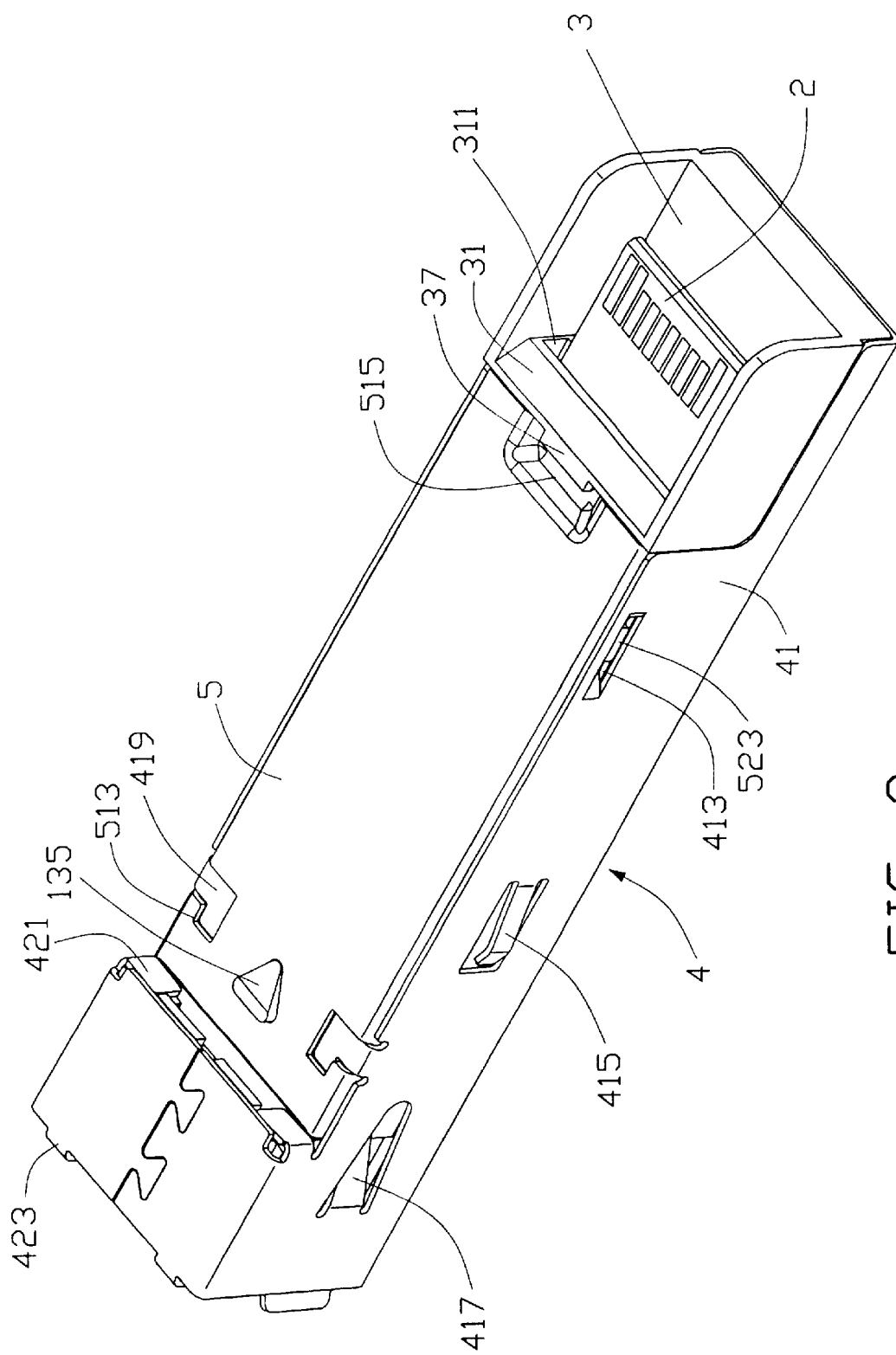
FIG. 3 is an assembled view of FIG. 1.

Referring particularly to FIGS. 1 and 3, in assembly of the optoelectronic transceiver module, the PCB 2 is slid into the guide grooves 151 of the connector housing 1. The block tags 153 of the connector housing 1 engage in the recesses 213 of the PCB 2, thereby preventing the PCB 2 from moving in either direction along the guide grooves 151. The PCB 2 is thus secured to the connector housing 1. The terminals 139 of the connector housing 1 engage with the corresponding contacts on the PCB 2, to establish electrical connection between the complementary electrical connector (not shown) and the PCB 2. The support base 3 is then fixed to the PCB 2. The rear section 22 of the PCB 2 is inserted through the slot 311 of the support base 3. The screw holes 350 of the support base 3 are aligned with the positioning holes 211 of the PCB 2. The screws 7 are extended through the positioning holes 211 of the PCB 2 to threadedly engage in the screw holes 350. Assembly of the optoelectronic transceiver module is thus completed.

The bottom plate 5 is then attached to the optoelectronic transceiver module. The flanges 52 of the bottom plate 5 are fittingly received in the positioning grooves 157 of the connector housing 1. A front edge of the bottom plate 5 abuts the steps 113 of the connector housing 1. The latch 135 of the connector housing 1 is received in the opening 511 of the bottom plate 5. A rear edge of the bottom plate 5 abuts the inner wall 31 of the support base 3, with a rear end of the trough portion 515 of the bottom plate 5 being engagingly received in the gap between the lower and upper blocks 37, 39 of the support base 3. The bottom plate 5 is thus secured on the connector housing 1 and support base 3, but does not contact the PCB 2.

Figure 4:
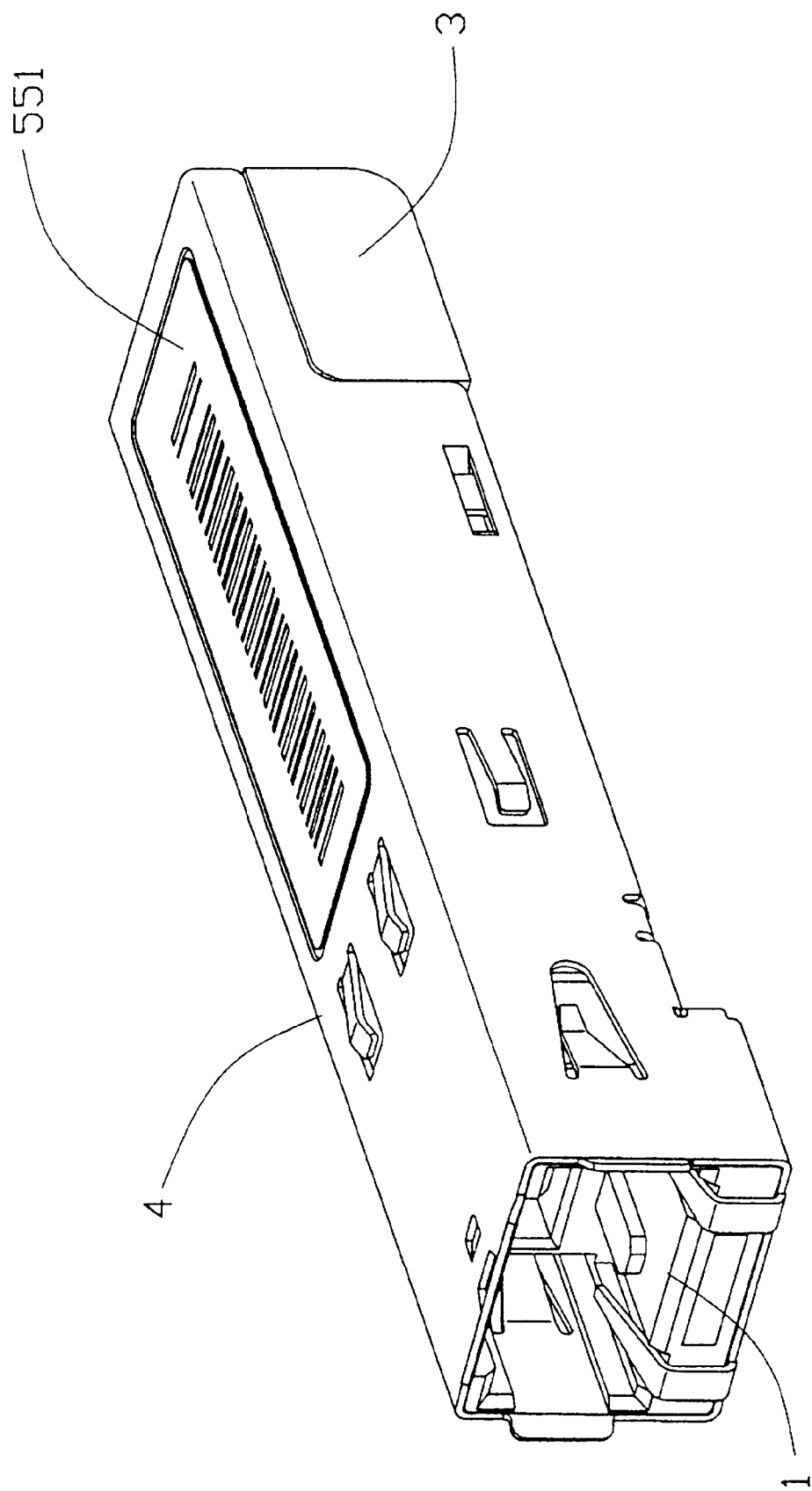
FIG. 4 is also an assembled view of FIG. 1, but viewed from a top aspect.

Referring also to FIGS. 2 and 4, the top frame 4 is then attached to the combined optoelectronic transceiver module and bottom plate 5. A slanted latch (not labeled) of the top frame 4 abuts the top wall 117 of the connector housing 1. The engaging tabs 523 of the bottom plate 5 are engagingly received in the sockets 413 of the top frame 4. The through hole 401 of the top frame 4 is aligned with the screw hole 337 of the support base 3. The screw (not labeled) is inserted through the through hole 401 and threadedly engaged in the screw hole 337. The L-shaped locking tabs 419 of the top frame 4 are bent inwardly and upwardly through the cutouts 513 of the bottom plate 5 to engage in cutouts 137 of the connector housing 1. The rectangular locking tabs 421 of the top frame 4 are bent inwardly to engagingly retain the steps 113 of the connector housing 1. The elongate locking tabs 423 of the top frame 4 are bent inwardly to be engagingly received in the locking grooves 115 of the connector housing 1. Thus the top frame 4 and bottom plate 5 are securely attached together, forming a complete metal shell encasing the optoelectronic transceiver module. The rectangular, elongate and L-shaped locking tabs 421, 423, 419 secure the top frame 4 to the connector housing 1. The engaging tabs 523 and sockets 413 secure the bottom plate 5 to the top frame 4. The labeling tape 511 is glued to the top face of the top plate 40 of the top frame 4, to show information about the optoelectronic transceiver module and to cover the screw (not labeled). Assembly of the optoelectronic transceiver module assembly is thus completed.

In an alternative embodiment of the present invention, the triangular latch 135 is integrally formed on the bottom plate 5 instead of on the connector housing 1. This enhances durability of the triangular latch 135.

It should be understood that various changes and modifications to the presently preferred embodiments described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optoelectronic transceiver module assembly comprising:
   an insulative connector housing comprising a latch and a pair of cutouts;
   a support base comprising at least one upper block and at least one lower block;
   a printed circuit board fixed on the connector housing and received in the support base;
   a top frame comprising a top plate, a bottom cover, a pair of side walls extending from the bottom cover, and a socket formed in each of the side walls;
   a bottom plate comprising a main panel and a pair of flanges, the main panel defining an opening receiving the latch of the connector housing, and defining a pair of cutouts, the main panel forming a trough portion engagingly received between the at least one lower block and the at least one upper block of the support base, and wherein
   a pair of engaging tabs respectively extends from the flanges of the bottom plate and engages in the sockets of the top frame, and
   a pair of locking tabs respectively extends from the side walls of the top frame through the cutouts of the bottom plate, and is engaged in the cutouts of the connector housing.

2. The optoelectronic transceiver module assembly as described in claim 1, wherein the connector housing forms a triangular latch thereon.

3. The optoelectronic transceiver module assembly as described in claim 1, wherein each of the locking tabs of the top frame is L-shaped.

4. The optoelectronic transceiver module assembly as described in claim 1, wherein the top frame further comprises at least one pair of locking tabs respectively extending from front portions of the side walls at a rear end of the bottom cover.

5. The optoelectronic transceiver module assembly as described in claim 1, wherein the top frame further comprises at least one pair of locking tabs bent inwardly from a front of the bottom cover and locking the top frame and the connector housing together.

6. The optoelectronic transceiver module assembly as described in claim 1, wherein the top frame further comprises:
   at least one pair of grounding fingers extend inwardly from the side walls of the top frame to electrically contact a complementary electrical or optical connector, and
   at least one pair of spring fingers extending outwardly from the top frame and adapted for providing protection against electrostatic discharge.

7. The optoelectronic transceiver module assembly as described in claim 1, wherein each of the sockets is formed by inwardly stamping each of the side walls of the top frame.

8. The optoelectronic transceiver module assembly as described in claim 1, wherein the trough portion is inwardly stamped at a rear end of the main panel.

9. The optoelectronic transceiver module assembly as described in claim 1, wherein the opening of the main panel of the bottom plate is dimensioned to correspond to the latch of the connector housing.

10. An optoelectronic transceiver module assembly comprising:
    a plastic connector housing comprising a pair of cutouts defined in a bottom surface thereof and a pair of positioning grooves defined in side walls thereof, the positioning grooves being in communication with respective proximate cutouts;
    a support base comprising at least one upper block and at least one lower block;
    a printed circuit board fixed to the connector housing and received in the support base;
    a top frame comprising a top plate, a bottom cover, a pair of side walls extending from the bottom cover, and a socket formed in each of the side walls; and
    a bottom plate comprising a main panel, a pair of flanges, a latch formed on a bottom face of the main panel, a pair of cutouts defined in the main panel, and a trough portion formed in the main panel and engaged between the at least one upper block and the at least one lower block of the support base, and wherein
- a pair of engaging tabs respectively extends from the pair of flanges of the bottom plate and engages in the sockets of the top frame, and
- at least one pair of locking tabs extends from the side walls of the top frame through the cutouts of the bottom plate, and is engaged in the cutouts of the connector housing.

11. The optoelectronic transceiver module assembly as described in claim 10, wherein each of the locking tabs of the top frame is L-shaped.

12. The optoelectronic transceiver module assembly as described in claim 10, wherein the top frame further comprises at least one pair of locking tabs bent inwardly from a front of the bottom cover and locking the top frame and the connector housing together.

13. The optoelectronic transceiver module assembly as described in claim 10, wherein the top frame further comprises at least one pair of locking tabs respectively extending from front portions of the side walls at a rear end of the bottom cover.

14. The optoelectronic transceiver module assembly as described in claim 10, wherein the top frame further comprises at least one pair of grounding fingers extending inwardly from the side walls to electrically contact a complementary electrical or optical connector housing, and at least one pair of spring fingers extending outwardly from the top frame for providing protection against electrostatic discharge.

15. The optoelectronic transceiver module assembly as described in claim 10, wherein each of the sockets is formed by inwardly stamping a corresponding side wall of the top frame.

* * * * *